US010346721B2

(12) United States Patent
Albright et al.

(10) Patent No.: US 10,346,721 B2
(45) Date of Patent: Jul. 9, 2019

(54) TRAINING A NEURAL NETWORK USING AUGMENTED TRAINING DATASETS

(71) Applicant: salesforce.com, inc., San Francisco, CA (US)

(72) Inventors: Evan Albright, San Francisco, CA (US); Caiming Xiong, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 24 days.

(21) Appl. No.: 15/801,297

(22) Filed: Nov. 1, 2017

(65) Prior Publication Data
US 2019/0130218 A1 May 2, 2019

(51) Int. Cl.
*G06K 9/62* (2006.01)
*G06N 3/08* (2006.01)
(Continued)

(52) U.S. Cl.
CPC ....... *G06K 9/6257* (2013.01); *G06K 9/00664* (2013.01); *G06K 9/2054* (2013.01); *G06K 9/627* (2013.01); *G06K 9/6262* (2013.01); *G06N 3/04* (2013.01); *G06N 3/08* (2013.01); *G06T 11/60* (2013.01)

(58) Field of Classification Search
CPC ............... G06T 7/0042; G06T 7/0022; G06T 2207/30261; G06T 2207/30241; G06T 7/001; G06T 2207/30252; G06T 2207/30236; G06T 7/73; G06T 7/50; G06T 7/55; G06T 3/0068; G06T 15/04; G06T 3/4046; G06T 9/002; G06T 2207/20084; G06K 9/00; G06K 9/00805; G06K 9/6202; G06K 9/6279; G06K 9/00785; G06K 9/00791; G06K 9/00228; G06K 9/66; G06K 7/1482; G01S 13/90; G01S 17/89; G01S 17/936; G01C 21/3602; B60K 31/00; B60K 37/06; A63F 13/327; A63F 13/213; A63F 13/25; A63F 13/32; A63F 13/332; A63F 13/335; A63F 13/655; A63F 13/00; G06N 3/08; G06N 3/02; G06N 7/046; H03H 2017/0208; H03H 2222/04
See application file for complete search history.

(56) References Cited

U.S. PATENT DOCUMENTS 8,849,017 B2 * 9/2014 Ito .......................... G06T 7/194
382/159

* cited by examiner

*Primary Examiner* — Duy M Dang
(74) *Attorney, Agent, or Firm* — Fenwick & West LLP

(57) ABSTRACT

A computer system generates augmented training datasets to train neural network models. The computer system receives an initial training dataset comprising images for training a neural network model, and generates an augmented training dataset by modifying images from the first training dataset. The computer system identifies a representation of a target object against a background from the initial training dataset and extracts a portion of the image displaying the target object. The computer system generates samples for including in the augmented training dataset based on the image. For example, new images may be obtained by performing transformations on the portion of the image displaying the target object and/or by overlaying the transformed portion of the image over a different background. The modified images are included in the augmented training dataset used for training the neural network model to recognize the target object.

20 Claims, 4 Drawing Sheets

(51) Int. Cl.
*G06N 3/04* (2006.01)
*G06K 9/20* (2006.01)
*G06T 11/60* (2006.01)
*G06K 9/00* (2006.01)

TRAINING A NEURAL NETWORK USING AUGMENTED TRAINING DATASETS

FIELD OF INVENTION

The disclosure relates to training of neural networks in general and more specifically to training neural networks using augmented training datasets.

BACKGROUND

Neural networks are used for performing complex tasks, for example, classification tasks in recognizing patterns or objects in images, natural language processing, computer vision, speech recognition, bioinformatics, and so on. The quality of result of a neural network depends on the quality of training of the neural network. Training such neural networks requires labelling of large amount of training data for identifying different classes of data, e.g. positive and negative examples. However, many training datasets misrepresent or underrepresent the data they're intending to train neural networks for.

For example, training datasets for a neural network for recognizing objects in an image may include images containing gorillas, and images containing dolphins. The neural networks may consider that an object in an image of jungle and/or green-centric sceneries is a gorilla, and an object in an image of ocean and/or blue environments is a dolphin. The neural networks may misclassify a photo of a human being in a jungle scenery or a photo of a swimming person. This is especially likely in classification tasks seeking to distinguish amongst a similar group (e.g. recognizing two different types of trees vs. recognizing a tree from a dog). Likewise some training datasets may include data that is obtained in a particular setting that may not match the setting of data processed by the trained neural network. For example, an image may be captured in one manner (e.g., with a specific camera, camera setting, indoor, etc.) and an input image that is processed may not conform to those same particularities.

Additionally, generating labelled samples of large training datasets can be an expensive process that requires manual processing. Therefore, conventional techniques for training neural networks are often inadequate and can result in misclassification of input data.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Embodiments perform training of neural network models using augmented training datasets. A computer system generates augmented training datasets to train neural network models, for example, convolutional neural networks. The computer system receives an initial training dataset comprising a plurality of images for training a neural network model. The initial training datasets includes a set of images. Each image of the set includes one or more target objects displayed against a background. The computer system generates an augmented training dataset by modifying images from the initial training dataset and including them in the augmented training datasets.

For example, the computer system identifies a representation of a target object in an image from the initial training dataset. The computer system extracts a portion of the image displaying the target object in the image. The computer system generates a new image from the selected by performing one or more transformations on the portion of the image. Examples of transformations include scaling the target object, rotating the target object, translating the target object, changing a brightness of the target object, changing a color of the target object (e.g., shifting a color of the object), changing a lighting condition of the target object, changing a perspective of the target object, or some combination thereof. The computer system may also generate a modified image by overlaying the portion of the image over a second background. In an embodiment, the computer system performs transformations on the portion of the image and overlays the transformed portion of the image on a new background. The computer system includes the modified image in the augmented training dataset. The computer system trains the neural network model based in part on the augmented training dataset.

System Overview

Figure 1:
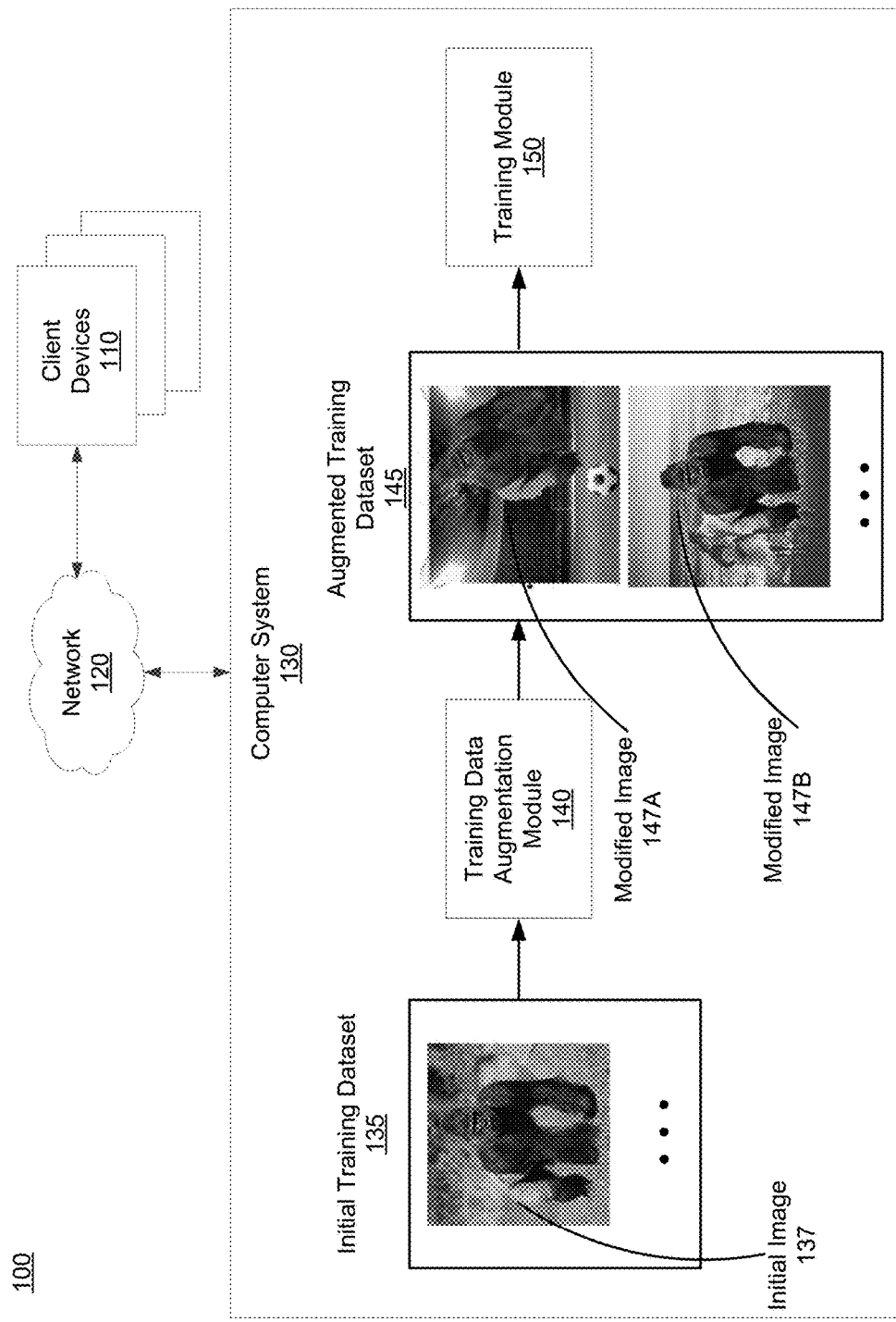
FIG. 1 shows a system environment for training neural networks using augmented training data sets, in accordance with an embodiment.

FIG. 1 shows a system environment 100 for training neural networks using augmented training data sets, in accordance with an embodiment. The system environment 100 includes one or more client devices 110, a network 120, and a computer system 130. Other embodiments can use more or less or different systems than those illustrated in FIG. 1. Functions of various modules and systems described herein can be implemented by other modules and/or systems than those described herein.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the computer system 130. For example, a client device 110 executes a browser application to enable interaction between the client device 110 and the computer system 130 via the network 120. In another embodiment, a client device 110 interacts with the computer system 130 through an application programming interface (API) running on a native operating system of the client device 110, such as IOS® or ANDROID™.

In various embodiments, a client device 110 includes an image capture device to capture a test image including a target object. The test image includes unlabeled data used during a test phase. Examples of the image capture device include a still camera, a video camera, or a webcam. The client device 110 provides the captured test image to the computer system 130 via the network 120, as further described below.

In alternative embodiments, the client device 110 provides one or more labeled images as initial training datasets to the computer system 130. For example, manufacturers use the client device 110 to provide standard images of their products and information associated with the products for training the computer system 130. In another example, experts use the client device 110 to perform labeling of images as initial training datasets. In various embodiments, the client device 110 verifies an output of the computer system 130. For example, a trained neural network model may recognize a target object in a test image received from the client device 110 and the output of the trained neural network is verified by an expert or other software validating the outputs of the trained neural network model via the client device 110. Alternatively, the validation can be performed by the computer system 130. In some embodiments, system administrators may use the client device 110 to perform various administrative tasks associated with the computer system 130.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The computer system 130 generates augmented training datasets based on initial training datasets to better train neural network models, and uses the trained neural network models to recognize target objects captured in the test image received from the client device 110. A neural network model has multiple hidden layers that are connected with each other. Each layer has multiple interconnected neurons (also referred to as nodes). A prediction process based on the neural network model is to compute a weight for each neuron and for each connection. Examples of the neural network model include a binary-class convolutional neural network, a multi-class convolutional neural network model or any other neural network model with one or more hidden layers. The computer system 130 can work as an online system that allows client devices to connect via a network, for example, the internet. Alternatively, the computer system 130 can be a standalone computer that works offline.

As shown in FIG. 1, the computer system 130 includes a training data augmentation module 140 and a training module 150. The training data augmentation module 140 uses an initial training dataset 135 to generate an augmented training dataset 145. The initial training dataset 135 includes a set of initial images. An initial image 137 of the set shows that a gorilla is in a zoo with a green-centric scenery and the gorilla is located in the center of the initial image 137. The augmented training dataset 145 includes a set of modified images associated with the set of initial images. For example, the training data augmentation module 140 generates two modified images 147A and 147B based on the initial image 137. The modified image 147A shows a rotated and translated gorilla in a stadium scenery and the gorilla is located at a different position from the initial image 137, and the modified image 147B shows a rotated gorilla in a beach scenery.

The training module 150 uses the generated augmented training dataset 145 to train neural network models. The augmented training dataset 145 conforms to the initial training dataset 135, but being presented in various ways (e.g., overlaying with a different background, rotated and translated target objects). As such, training data is varied and expanded to overcome misclassifications and to reduce overfittings. Better target object recognition performed by a trained neural network model can be achieved. The computer system 130 is further described below in FIG. 2.

Computer System Architecture

Figure 2:
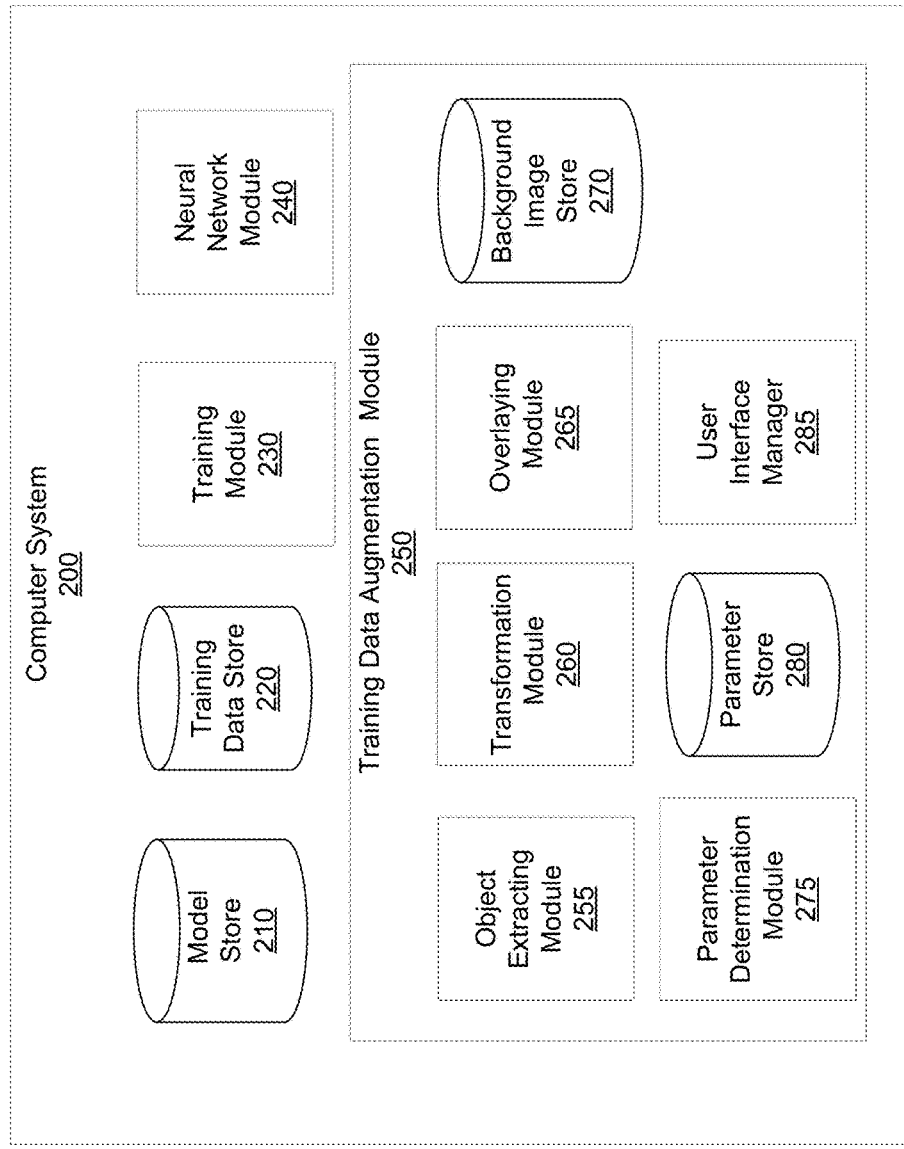
FIG. 2 shows a system architecture of a computer system, in accordance with an embodiment.

FIG. 2 shows a system architecture of the computer system 200, in accordance with an embodiment. In the embodiment of FIG. 2, the computer system 200 includes a model store 210, a training data store 220, a training module 230, a neural network module 240, and a training data augmentation module 250. The computer system 200 is an embodiment of the computer system 130. In other embodiments, the computer system 200 may include additional or less modules than those shown in FIG. 2. Furthermore, specific functionality may be implemented by modules other than those described herein. In some embodiments, various components illustrated in FIG. 2 may be executed by different computer systems 130. For example, the training data augmentation module 250 may be executed by one or more processors different from the processors that execute the training module 230 or the neural network module 240.

The model store 210 stores trained and/or untrained neural network models or machine learning models. The model stores 210 provides the untrained neural network models to the training module 230, and provides the trained neural network models to the neural network module 240. In an embodiment, a model stored in the model store 210 comprises weights of the model and instructions associated with the model, for example, instructions for processing an input and generating the output for the model.

The training data store 220 stores initial training datasets and augmented training datasets. Both initial and augmented training datasets comprise labelled data with labels assigned to each data representing an expected output corresponding to the data. For example, a training dataset may comprise a set of images labelled with the type of a target object displayed in the image for training a model for predicting the target object shown in an image. The augmented training datasets comprise modified labeled data based on the initial training datasets via the training data augmentation module 250. In an embodiment, each sample of the initial training dataset is used to generate a plurality of samples of the augmented training dataset. As a result, a small initial training dataset is used to generate a large augmented training dataset. Since generating labelled samples can be an expensive process that requires manual processing, embodiments allow generation of large augmented training datasets from small initial training datasets thereby making the process of generating training datasets cost effective.

In various embodiments, the initial training datasets include a set of images. Each image of the set includes one or more target objects displayed against a background. The augmented training datasets include a set of modified images, and one or more modified images (e.g., the modified images 147A and 147B) are modified based on an image (e.g., the initial image 137) of the set in the initial training datasets, as further described below in the training data augmentation module 250. In alternative embodiments, one or more images of the initial training datasets are not modified by the training data augmentation module 250. The one or more images are directly used to train the neural network model. For example, one or more test images with accurate recognized target objects by the trained neural network model are stored as the initial training dataset in the training data store 220, as further described below. Alternatively, the one or more test images can be also modified to generate the augmented training datasets.

In various embodiments, the initial training datasets are received from the client device 110. For example, the initial training datasets are a set of images of products provided by manufacturers via the client device 110. In another example, the initial training datasets are a set of images labelled by experts via the client device 110. Additionally, the initial training datasets are validated outputs from the trained neural network models. For example, the trained neural network model may recognize a target object in a test image received from the client device 110 and the output of the trained neural network is verified by an expert or other software validating the outputs of the trained neural network model. The test image with accurate objet recognition is stored as the initial training dataset in the training data store 220.

The training module 230 trains one or more neural network models using the augmented training datasets. The training module 230 is an embodiment of the training module 150. In various embodiments, the training module 230 trains the neural network model by comparing an output (e.g., a prediction result of the model) of executing the neural network model for an input (e.g., an image of the augmented training dataset) with the expected label associated with the input to determine a measure of error in the output. The errors observed in the outputs of various inputs are fed back into the neural network model to adjust the various weights associated with the nodes and the connections of the neural network model. This process is repeated iteratively until an aggregate metric based on the error is determined to be below a certain threshold value. The training module 230 repeats the process of training the neural network model through multiple iterations.

In various embodiments, the training module 230 also trains machine learning models. For example, the training module 230 trains a machine learning model using the augmented training dataset by weighting various features, such that features that are more relevant to the expected label associated with the input tend to have higher weight than features that are less relevant to the expected label. Accordingly, the training data augmentation module 250 generates augmented training datasets for training the machine learning model.

The neural network module 240 applies a trained neural network model to process input samples and generate one or more score values. In an embodiment, the trained neural network is configured to receive an image as input and generate a score for an input image. For example, the trained neural network may generate a score for recognizing a target object in an input image received from the client device 110. The input image includes a target object. The trained neural network model predicts a score indicating a likelihood that the target object represents a particular type of object. For example, the trained neural network model may determine whether an image includes a type of animal, a plant, or a particular type of inanimate object.

In an embodiment, the trained neural network determined various attributes of the target object recognized in the input image. Examples of attributes of the target object that a trained neural network may recognize include a brand name of a target object (e.g., a manufacturer of shoes), a style of a target object (e.g., style number, NIKE AIR™ NIKE METCON 3™, etc.), a color of a target object (e.g., black, white, red, mixed color, etc.), an activity that a target object is used for (e.g., running, football, basketball, lifestyle, etc.), a gender that a target object is used for (e.g., men, women, boys, or girls), a category of a target object (e.g., shoes or sneakers), or some combination thereof. The trained neural network model generates an output indicating the classifications of the one or more target objects in the input image, and provides the output for display via the client device 110.

For example, a user uses the client device 110 to capture a test image of a target object (e.g., a pair of shoes worn by a person). The neural network module 240 receives the test image and uses the trained neural network model to recognize the target object. The trained neural model recognizes that the target object is a pair of white NIKE METCON 3™ shoes for women training.

In various embodiments, the neural network module 240 may provide the output to the client device 110 for verification. If the output is verified to be accurate, the neural network module 240 determines a label for the test image based on the target object to obtain a labeled image, and adds the labeled image to the initial training dataset.

Training Data Augmentation Module

The training data augmentation module 250 modifies the initial training dataset to generate the augmented training datasets. The training data augmentation module 250 is an embodiment of the training data augmentation module 140. In the embodiment of FIG. 2, the training data augmentation module 250 includes a target object extracting module 255, a transformation module 260, an overlaying module 265, a background image store 270, a parameter determination module 275, a parameter store 280, and a user interface manager 285. In other embodiments, the training data augmentation module 250 may include additional or less modules than those shown in FIG. 2. Furthermore, specific functionality may be implemented by modules other than those described herein. In some embodiments, various components illustrated in FIG. 2 may be executed by different training data augmentation module 140. For example, the parameter determination module 275 may be executed by one or more processors different from the processors that execute the target object extracting module 255, or the transformation module 260.

The target object extracting module 255 extracts a portion containing one or more target objects from the initial training dataset. In various embodiments, the initial training dataset includes a set of images. The target object extracting module 255 identifies a representation of a target object displayed in an image from the set such that the identified representation includes the target object displayed against an initial background. The target object extracting module 255 extracts a portion of the image displaying the target object but excludes other objects in the image. For example, the target object extracting module 255 extracts a portion containing the gorilla as a target object of the initial image 137 but excludes other objects such as trees in the background.

The transformation module 260 performs one or more transformations on the extracted portion. Examples of the one or more transformations includes scaling the target object, rotating the target object, translating the target object, changing a brightness of the target object, changing a color of the target object (e.g., shifting a color of the target object), changing a lighting condition of the target object, changing a perspective of the target object, or some combination thereof. For example, the initial image 137 shows that the gorilla is located in the center. The modified image 147A shows that a rotated and translated gorilla is not located at a different position from the initial image 137. Another example is further described in FIG. 3.

The overlaying module 265 generates a modified training dataset by overlaying the transformed portion over a different background from an initial background. For example, the initial image 137 shows the gorilla in an initial background that is a zoo with a green-centric scenery. The modified image 147A shows the gorilla in a different background that is a stadium scenery, and the modified image 147B shows the gorilla in a different background that is a beach scenery. In various embodiments, the overlay module 265 adjusts an image size and/or an image resolution of the different background to match those of the initial background such that the adjusted background can be overlaid with the transformed portion. The different background is retrieved from the background image store 270.

The background image store 270 stores various background images. In various embodiments, the background image store 270 stores background images with different image sizes and/or image resolutions to match background images of the initial training datasets. In an embodiment, the computer system receives various background images that can be used against target objects from a user. In other embodiments that computer system 200 extracts the background images from samples provided by a user as training datasets by removing one or more objects from the foreground of the image.

The parameter determination module 275 determines one or more transformation parameters based on several factors. Each transformation parameter determines an amount the transformation performed by the transformation module 260. Examples of the factors include information describing the client device 110 that captures the image (e.g., camera settings, camera type, etc.), information describing the target object captured in the image (e.g., brand, color, style, etc.), or information describing the surrounding environment of the target object (e.g., lighting conditions, indoor environment, outdoor environment, etc.), or historic data (e.g., past test images, past training datasets, etc.) associated with the above information. Examples of the transformation parameters include parameters (e.g., upper and lower limits, resize ratio, etc.) associated with scaling the target object, parameters (e.g., upper and lower limits, an amount of a rotation in degrees, a rotation direction, etc.) associated with rotating the target object, parameters (e.g., upper and lower limits, translation value, translation vector, etc.) associated with translating the target object, parameters (e.g., upper and lower limits, a brightness value relative to an original brightness, etc.) associated with changing a brightness of the target object, parameters (e.g., upper and lower limits, a specific range of colors, a color value relative to an original color, etc.) associated with changing a color of the target object, parameters (e.g., upper and lower limits, a location of a light source that illuminates the target object, a color of the light source, a type of the light source, etc.) with changing a light condition of the target object, parameters (e.g., upper and lower limits, a type of a perspective, a location of a camera, etc.) with changing a perspective of the target object. The transformation parameters are stored in the parameter store 280. In various embodiments, the transformation parameters can be received from the client device 110.

The user interface manager 285 manages a user interface to receive images, and/or transformation parameters from the client device 110, and provides outputs of the neural network module 240 to the client device 110. In an embodiment, one or more transformations are received from a user via a user interface of a client application presented to a user. For example, a user reviews a few images and provides a few example transformations.

The parameter determination module 275 determines ranges of parameters of various transformations based on the example transformations performed by the user and applies the transformations to other images for generating new samples for adding to an augmented training dataset.

Figure 3:
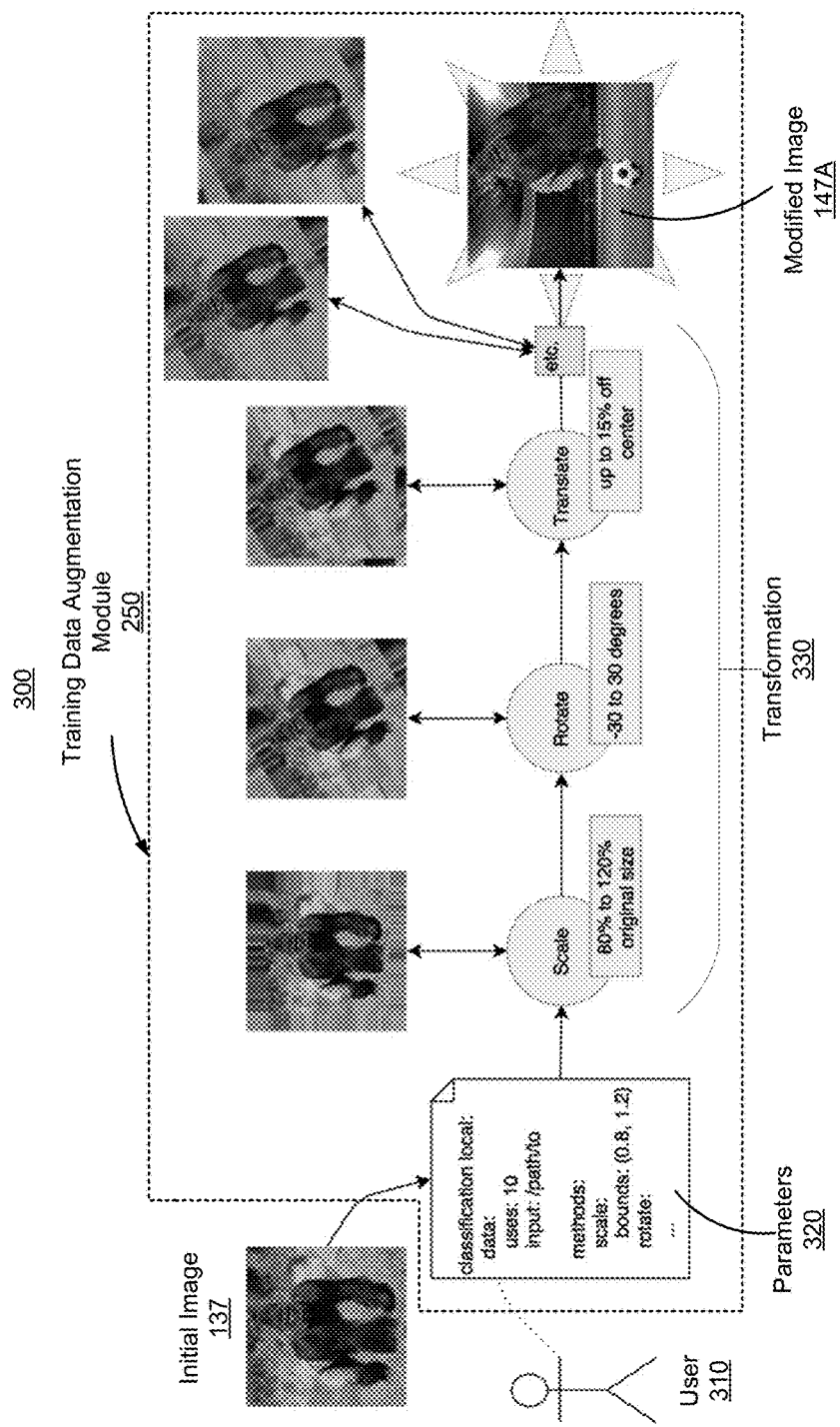
FIG. 3 shows an example of a process of augmenting training data, in accordance with an embodiment.

FIG. 3 shows an example 300 of the process of augmenting training data, in accordance with an embodiment. As show in FIG. 3, the training data augmentation module 250 receives the initial image 137 from the training data store (not shown). The parameters 320 include information associated with the initial image (e.g., "Input: /path/to"), information associated with the user (e.g., "users: 10"), values of transformation parameters (e.g., bounds (0.8 1.2) for scale) from the user 310, via the client device 110 (not shown). The training data augmentation module 250 performs several transformations 330 to generate the modified image 147A. For example, the training data augmentation module 250 reduces a size of the portion displaying the gorilla to 90% of the original size, and then rotates the portion 20 degrees counterclockwise, translates the portion by 10% off from the center, and then scales and translates the portion again (or performs other transformations), and so. The training data augmentation module 250 overlays the transform portion with a stadium background to generate the modified image 147A.

Process for Generating Augmented Training Datasets

Figure 4:
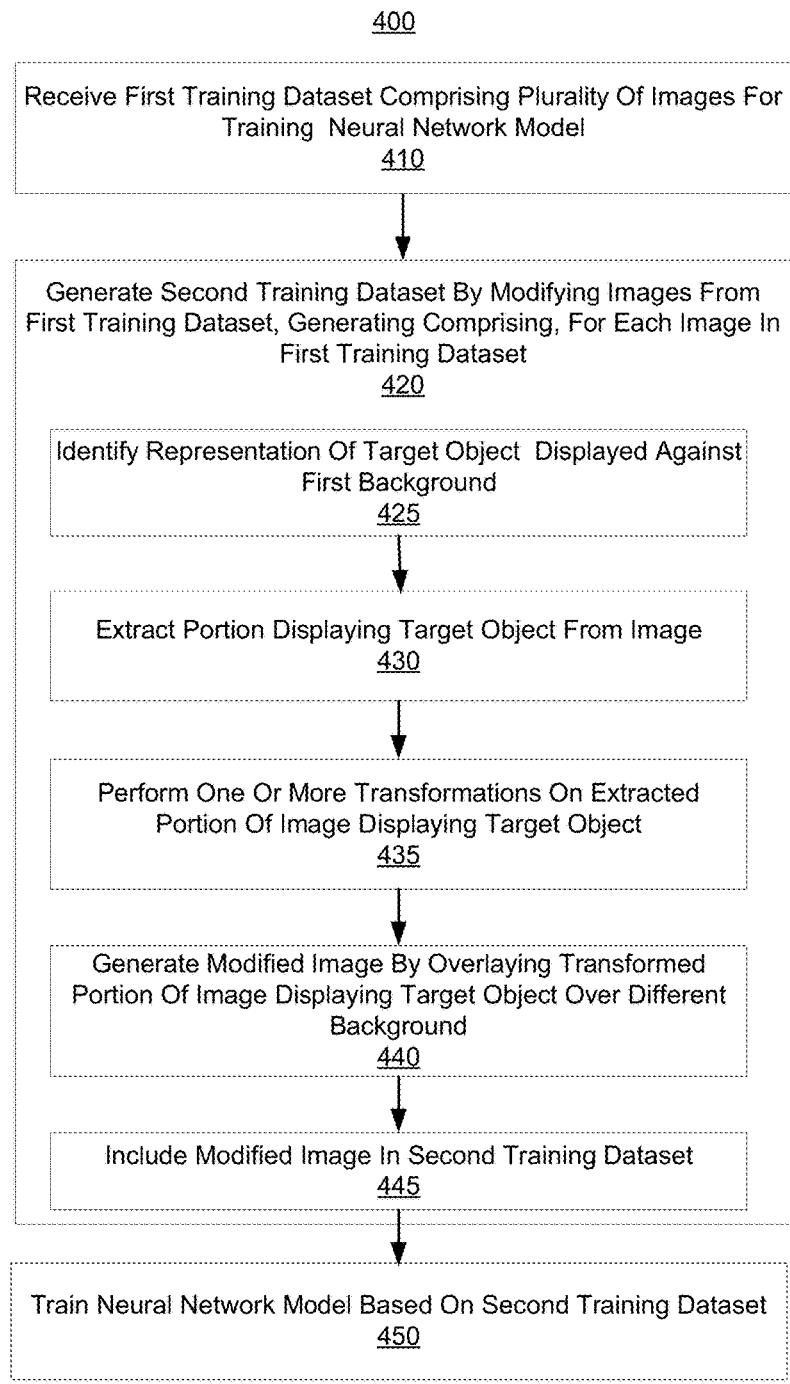
FIG. 4 illustrates a process for generating an augmented training dataset to train a neural network model, in accordance with an embodiment.

FIG. 4 illustrates a process 400 for generating an augmented training dataset to train a neural network model, in accordance with an embodiment. The process 400 is performed by the computer system 200 (or the computer system 130). The process 400 include different or additional steps than those described in conjunction with FIG. 4 in some embodiments or perform steps in different orders than the order described in conjunction with FIG. 4.

The computer system 200 receives 410 a first training dataset comprising a plurality of images for training a neural network model, for example, a convolutional neural network. The first training dataset is the initial training dataset as described above with respect to the training data store 220 in FIG. 2. Although the process illustrated in FIG. 4 shows generating augmented training datasets for a neural network, the process can be used for generating augmented training datasets for any machine learning based model.

The computer system 200 generates 420 a second training dataset by modifying images from the first training dataset.

For at least a set of images of the first training dataset, the computer system 200 identifies 425 a representation of a target object in an image from the set. The identified representation comprises the target object displayed against a first background. The computer system 200 extracts 430 a portion of the image displaying the target object of the image, and performs 435 one or more transformations on the portion of the image. The computer system generates 440 a modified image by overlaying the transformed portion of the image over a second background, and includes 445 the modified image in the second training dataset. Examples are described above in FIGS. 2 and 3. The computer system generates 440 may generate a modified image by performing any one of the transformation or the overlaying the target object on a new background or both.

The computer system 200 trains 450 the neural network model based in part on the second training dataset. In an embodiment, the neural network model is trained using the second training dataset until the accuracy metric reaches below a threshold value. An example of training the neural network model is described above with respect to the training module 230 in FIG. 2.

Alternative Embodiments

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a training dataset for training a convolutional neural network model to recognize a target object, the method comprising:
   receiving, by a computer system, a first training dataset comprising a plurality of images of the target object for training the convolutional neural network model;
   generating, by the computer system, a second training dataset by modifying images from the first training dataset, the generating comprising, for each image in the first training dataset:
      identifying, by the computer system, a representation of the target object displayed against a first background;
      extracting, by the computer system, a portion of the image displaying the target object;
      performing, by the computer system, one or more transformations on the portion of the image displaying the target object;
      generating, by the computer system, a modified image by overlaying the transformed portion of the image displaying the target object over a second background; and
      including the modified image in the second training dataset; and
   training, by the computer system, the convolutional neural network model to recognize the target object based at least in part on the second training dataset.

2. The method of claim 1, wherein each transformation represents one or more of: scaling the target object, rotating the target object, translating the target object, changing a brightness of the target object, changing a color of the target object, changing a light condition of the target object, changing a perspective of the target object, or some combination thereof.

3. The method of claim 1, wherein each transformation is associated with one or more transformation parameters, wherein each transformation parameter determines an amount of transformation performed.

4. The method of claim 3, wherein each transformation parameter is determined based on one or more of: information describing a device that captures the image, information describing the target object captured in the image, or information describing a surrounding environment of the target object, or some combination thereof.

5. The method of claim 1, further comprising:
receiving, by the computer system, a new image from a client device, the new image comprising a new target object to be recognized; and
recognizing, by the computer system, the new target object based on the trained convolutional neural network model.

6. The method of claim 5, wherein recognizing the new target object by the convolutional neural network further comprises recognizing one or more of: a brand name of the new target object, a style of the new target object, a color of the new target object, an activity that the new target object is used for, a gender that the new target object is used for, a category of the new target object, or some combination thereof.

7. The method of claim 5, further comprising
determining, by the computer system, a label for the new image based on the recognized new target object to obtain a labeled image; and
adding the labeled image to the first training dataset.

8. The method of claim 1, wherein the second training dataset comprises a plurality of images obtained from a particular image of the first training data set.

9. A non-transitory computer-readable storage medium comprising computer program instructions that when executed by a computer processor of a computer system causes the processor to perform steps comprising:
receiving, by a computer system, a first training dataset comprising a plurality of images of a target object for training a convolutional neural network model;
generating, by the computer system, a second training dataset by modifying images from the first training dataset, the generating comprising, for each image in the first training dataset:
identifying, by the computer system, a representation of the target object displayed against a first background;
extracting, by the computer system, a portion of the image displaying the target object;
performing, by the computer system, one or more transformations on the portion of the image displaying the target object;
generating, by the computer system, a modified image by overlaying the transformed portion of the image displaying the target object over a second background; and
including the modified image in the second training dataset; and
training, by the computer system, the convolutional neural network model to recognize the target object based at least in part on the second training dataset.

10. The non-transitory computer-readable storage medium of claim 9, wherein each transformation represents one or more of: scaling the target object, rotating the target object, translating the target object, changing a brightness of the target object, changing a color of the target object, changing a lighting condition of the target object, changing a perspective of the target object, or some combination thereof.

11. The non-transitory computer-readable storage medium of claim 9, wherein each transformation is associated with one or more transformation parameters, wherein each transformation parameter determines an amount of transformation performed.

12. The non-transitory computer-readable storage medium of claim 11, wherein each transformation is associated with one or more transformation parameters, wherein each transformation parameter is determined based on one or more of: information describing a device that captures the image, information describing the target object captured in the image, or information describing a surrounding environment of the target object, or some combination thereof.

13. The non-transitory computer-readable storage medium of claim 9, further comprising:
receiving, by the computer system, a new image from a client device, the new image comprising a new target object to be recognized; and
recognizing, by the computer system, the new target object based on the trained machine learning model.

14. The non-transitory computer-readable storage medium of claim 13, wherein recognizing the new target object comprises recognizing one or more of: a brand name of the new target object, a style of the new target object, a color of the new target object, an activity that the new target object is used for, a gender that the new target object is used for, a category of the new target object, or some combination thereof.

15. The non-transitory computer-readable storage medium of claim 13, further comprising
determining, by the computer system, a label for the new image based on the recognized new target object to obtain a labeled image; and
adding the labeled image to the first training dataset.

16. The non-transitory computer-readable storage medium of claim 9, wherein the second training dataset comprises a plurality of images obtained from a particular image of the first training dataset.

17. A computer system comprising:
a processor; and
a non-transitory computer-readable storage medium containing instructions that, when executed by the processor, cause the processor to:
receive, by the computer system, a first training dataset comprising a plurality of images of a target object for training a convolutional neural network model to recognize the target object;
generate, by the computer system, a second training dataset by modifying images from the first training dataset, the generating comprising, for each image in the first training dataset:
identifying, by the computer system, a representation of the target object displayed against a first background;
extracting, by the computer system, a portion of the image displaying the target object;
performing, by the computer system, one or more transformations on the portion of the image displaying the target object;

generating, by the computer system, a modified image by overlaying the transformed portion of the image displaying the target object over a second background; and including the modified image in the second training dataset; and train, by the computer system, the convolutional neural network model to recognize the target object based at least in part on the second training dataset.

18. The computer system of claim 17, wherein each transformation represents one or more of: scaling the target object, rotating the target object, translating the target object, changing a brightness of the target object, changing a color of the target object, changing a lighting condition of the target object, changing a perspective of the target object, or some combination thereof.

19. The computer system of claim 17, wherein the instructions further cause the processor to:

receive, by the computer system, a new image from a client device, the new image comprising a new target object to be recognized; and recognize, by the computer system, the new target object based on the trained convolutional neural network model.

20. The computer system of claim 17, wherein the second training dataset comprises a plurality of images obtained from a particular image of the first training data set.

* * * * *

UNITED STATES PATENT AND TRADEMARK OFFICE
CERTIFICATE OF CORRECTION

PATENT NO. : 10,346,721 B2  
APPLICATION NO. : 15/801297  
DATED : July 9, 2019  
INVENTOR(S) : Albright et al.

Page 1 of 1

It is certified that error appears in the above-identified patent and that said Letters Patent is hereby corrected as shown below:

In the Claims

In Column 11, Claim 7, Line 33, delete "comprising" and insert -- comprising: --, therefor.

In Column 12, Claim 15, Line 38, delete "comprising" and insert -- comprising: --, therefor.

Signed and Sealed this
Fourteenth Day of January, 2020

Andrei Iancu
*Director of the United States Patent and Trademark Office*